United States Patent [19]

Leshner et al.

[11] 4,368,707

[45] Jan. 18, 1983

[54] ADAPTIVE CHARGE FORMING SYSTEM FOR CONTROLLING THE AIR/FUEL MIXTURE SUPPLIED TO AN INTERNAL COMBUSTION ENGINE

[75] Inventors: Ervin Leshner, Cherry Hill; Michael D. Leshner, Glendora, both of N.J.

[73] Assignee: Fuel Injection Development Corporation, Bellmawr, N.J.

[21] Appl. No.: 172,665

[22] Filed: Jul. 28, 1980

Related U.S. Application Data

[63] Continuation-in-part of Ser. No. 743,764, Nov. 22, 1976, Pat. No. 4,232,643.

[51] Int. Cl.³ .......................... F02B 33/00; F02M 7/00
[52] U.S. Cl. ..................................... 123/436; 123/419; 123/585
[58] Field of Search ............... 123/436, 440, 438, 419, 123/585, 437

[56] References Cited

U.S. PATENT DOCUMENTS

| | | | |
|---|---|---|---|
| 2,628,606 | 2/1953 | Draper | 123/436 |
| 3,789,816 | 2/1974 | Japlin | 123/436 |
| 4,015,569 | 4/1977 | Leshner et al. | 123/557 |
| 4,015,572 | 4/1977 | Leshner et al. | 123/460 |
| 4,026,251 | 5/1977 | Schweitzer | 123/419 |
| 4,099,493 | 7/1978 | Latsch | 123/436 |
| 4,104,990 | 8/1978 | Frobenius | 123/436 |
| 4,161,162 | 7/1979 | Latsch | 123/436 |
| 4,231,335 | 11/1980 | Hallberg | 123/440 |
| 4,232,643 | 11/1980 | Leshner | 123/436 |

*Primary Examiner*—Ronald B. Cox
*Attorney, Agent, or Firm*—Woodcock, Washburn, Kurtz, Mackiewicz & Norris

[57] ABSTRACT

An adaptive charge forming system for an internal combustion engine is disclosed which monitors a parameter of engine combustion efficiency, such as power output, and derives a signal indicating the direction and amplitude of power change. The fuel mixture control system responds to changes in power output, regardless of their source, to maintain the engine air/fuel ratio in a preferred region. In a preferred embodiment, engine crankshaft angular acceleration is monitored to maintain the air/fuel mixture at the lean limit. A stepping motor is used to control a value for bleeding additional air into the charge; a clock provides steady pulses to the motor, tending to lean the mixture, while enrichment is effected upon the detection of each weak combustion event. The clock frequency thus sets the equilibrium rate of weak combustion events, defining the optimal mixture to be supplied to the engine.

24 Claims, 2 Drawing Figures

Fig. 1

ADAPTIVE CHARGE FORMING SYSTEM FOR CONTROLLING THE AIR/FUEL MIXTURE SUPPLIED TO AN INTERNAL COMBUSTION ENGINE

CROSS-REFERENCE TO RELATED APPLICATION

This application is a continuation-in-part of copending application Ser. No. 743,764, filed Nov. 22, 1976, now U.S. Pat. No. 4,232,643.

FIELD OF THE INVENTION

The present invention relates to charge forming systems for use with internal combustion engines, and more particularly to a system which automatically and continuously seeks the optimum air/fuel mixture to be supplied to the engine.

BACKGROUND OF THE INVENTION

The provision of an instantaneously correct fuel/air mixture to an internal combustion engine over a full range of speeds and loads has for years occupied countless engineers, technicians and inventors. Accordingly, the charge forming apparatus have progressed over the years from crude mixing devices to complex, sophisticated carburetion and fuel injection systems. Nonetheless, it is recognized that to date no charge forming system has been implemented which will provide the ideal fuel/air mixture to an internal combustion engine over a complete operating range.

Of the various approaches to charge forming systems, two basic lines of attack may be discerned. With one approach, air inflow is controlled by a throttle or the like and fuel is caused to be entrained with the passing air, in response to the air flow characteristics. The metering of the mixing apparatus is such that a relatively constant, predictable mixture results over the anticipated air flow range. This is the basic rule of operation of the carburetor, which is of course the predominant charge forming mechanism used with internal combustion engines. The same thesis, however, has also been implemented in many forms of fuel injection apparatus.

This approach may be referred to as a "programmed" approach inasmuch as the charge forming system is "programmed" or adjusted to respond to certain stimuli to effect a predetermined fuel/air ratio. The stimuli applied to such systems may include temperature, pressure, engine speed, and the like. Conventionally, such systems make use of not one but a plurality of stimuli in order to more accurately react to inferred engine operating conditions. Charge forming systems of this type thus react to given types of stimuli in a predetermined manner, effecting a fuel/air ratio which is assumed to be the "correct" one for the engine. In theory this approach should work well, assuming that a great number of preprogrammed responses are available to correspond to the almost limitless combinations of stimuli which occur over the full range of operation for most internal combustion engines, especially those used in vehicles.

In recent years the increased recognition of environmental degradation caused by internal combustion engine exhaust, along with the need for economical operation, has caused renewed interest in more efficient and sophisticated charge forming control systems. Generally, the approach taken in developing more responsive charge control systems has been to make use of the most modern and sophisticated technology, particularly in the field of electronics, to accommodate the functional complexities which are inherent in the "programmed" type of system. That is, modern technology is used to implement a more complicated "program". Accordingly, control systems which are in effect small analog or digital computers are created which can "tailor" a fuel/air ratio to a given operating condition, as evidenced by various stimuli. The stimuli or sensed parameters include exhaust gas temperature and composition, engine temperature, combustion pressure, inlet manifold and/or venturi vacuum, engine speed, along with many other operating parameters. However, inasmuch as all such programmed systems provide a fixed, predetermined response to a given set of stimuli, they cannot be flexible enough to find the true optimum fuel/air ratio for all operating conditions, but rather provide mixture ratios which are only assumed to be correct given certain stimuli.

Accordingly, it will be appreciated that it would be desirable to provide an improved charge forming system which consistently achieves the actual optimum fuel/air ratio for any given operating condition.

When the constraints of exhaust emission control, fuel consumption, and vehicle drivability are considered, the optimum engine fuel/air mixture for an internal combustion engine is one which is in the vicinity of the lean limit. This "optimum mixture" normally changes significantly with changes in fuel chemistry, ambient conditions and engine operating conditions. Accordingly, modern programmed charge forming systems, despite exceeding complexity, are nevertheless systems unable to respond to all such variables.

The second basic approach to provision of a fuel/air charge to a vehicle engine recognizes that a typical vehicle internal combustion engine is subjected to extreme variations in speed and load, and that these variations occur rapidly. The ideal control system, which would seek out the optimum mixture continually, must therefore be able to respond to changes in speed and load very rapidly, to avoid the delivery of an off-optimum mixture to the engine during transient operation. Moreover, it would be desirable to provide a control system capable of compensating for these variables, as well as others such as differing fuels and the like without modification. The prior art shows several "adaptive" mixture controllers which are stated to seek out the lean limit mixture, but their slowness of response to transient engine conditions has prevented their use in vehicles. The charge forming system of the invention is likewise "adaptive" in that it continuously monitors engine output characteristics and adjusts the charge accordingly.

For example, U.S. Pat. No. 2,628,606 to Draper and Li discloses the use of a closed loop control system, for oscillating or "dithering" the air/fuel mixture supplied to an engine about a set point. The engine output is observed, and the mixture controlled in the direction of increasing output. This "dithering" technique has been successfully applied to control of the spark timing, but has never been successfully demonstrated for dynamic control of the air/fuel mixture. The explanation for this shortcoming lies in the response times of the individual elements in a mixture control loop. In the case of Draper and Li, the minimum timed required to complete one dither-cycle is determined by the maximum rate of response of the engine to a change of mixture. It has been demonstrated experimentally that the maximum dither frequency which produces a measurable effect is approximately 5 cycles per second. At mixture dither frequencies above that value, the engine is unable to respond. However, at a dither rate of 5 cycles per second, information about the power output can only be computed every 200 milliseconds, which is far too slow to track transient engine operation.

Taplin et al were granted U.S. Pat. No. 3,789,816 for an improved mixture control system which adaptively leans the mixture until the engine becomes rough. The Taplin system monitors the absolute value of instantaneous crankshaft acceleration, and as long as the magnitude of acceleration/deceleration remains below a predetermined threshold amplitude, the mixture is biased continuously leaner. Effectively, roughness is compared continuously with a threshold which represents an "acceptable drivability" level; when roughness exceeds the preset reference, the mixture is enriched.

As in the case of the Draper and Li system, the Taplin roughness governor is workable under steady state conditions, but suffers from slowness of response. This slowness is an indirect result of the basic control philosphy: that is, use of the preset level of roughness for two purposes. The roughness threshold defined in Taplin et al is used both as a standard for comparison, and as the desired level of roughness which the servo loop is designed to produce. That is, the aimed-at point is also the point of comparison. Moreover, all differences from the desired point are treated equally; in other words, the Taplin patent describes a control system which seeks out an optimum mixture, without regard for how near or far the actual mixture is from optimum. Therefore, in order that the Taplin control system can avoid "overshooting" its prescribed roughness level, it must approach the thus-defined lean limit very slowly. Since the Taplin mixture controller does not "know" whether the desired operating point is near or far from the actual operating point, it must always travel in the lean direction at the same rate, limited by the servo system "overshoot" characteristics. It will be appreciated that a finite amount of time is required for an altered air/fuel mixture to be drawn into the intake manifold, drawn into the combustion chamber, be compressed, ignited, and expanded. This time delay is RPM-dependent, approximately equal to one complete engine cycle, or 1/RPM. If the mixture controller of Taplin sees roughness which is less than the preset threshold, it causes the mixture to be leaned at some prescribed rate; if roughness is detected which is above the threshold, the mixture entering the engine intake is enriched. Thus, the roughness signal which initiates enrichment occurs approximately one revolution after the "too lean" mixture was supplied by the control system. During the period between the ingestion of the "too lean" mixture by the engine and the resulting roughness at the output, the control element will have continued to bias the mixture leaner at its pre-selected rate; the greater the rate of mixture change, the greater the overshoot. It is for this reason that a control system such as described by Taplin must have a limited rate of change of mixture. This limitation directly affects the transient response of the whole control loop. It is admitted by Taplin et al that their system is only workable under steady state conditions:

It is therefore another object of the present invention to provide a closed loop fuel control system that normally maintains as lean as air fuel [sic] as possible so as to just follow the threshold of unacceptable engine roughness during steady state operation and that permits a different control of air fuel ratio to be effected in the presence of other modes of operation.

Additionally, Taplin et al failed to recognize the fact that the positive and negative components of roughness indicate different phenomena. Instead the Taplin system full-wave-rectifies the roughenss signal, weighing positive and negative roughness components equally, and richening in response to both.

In U.S. Pat. Nos. 4,099,493 and 4,161,162 as well as in abandoned application Ser. No. 597,404 Latsch et al aim at the same objective (controlling the mixture at the lean limit) but use a different strategy. Instead of monitoring the instantaneous value of a continuous signal, the Latsch schemes all sample an indication of roughness at discrete, non-continuous intervals. The period length is defined in application Ser. No. 597,404 thus: "... the phase angle is measured after each or after several operating cycles of the engine." Other methods for achieving the same goal are disclosed in Latsch et al U.S. Pat. No. 4,161,162. Each of the Latsch methods involves the sampling of discrete portions of the "roughness signal", and performing a comparison either with a synthetic "ideal signal" or between two or more subsequent samples. Such comparisons cannot be made until the end of a discrete sample period. In other words, the sampling is discontinuous, and the information gathered by the process is incomplete. Therefore, no decision can be made by the comparison circuit until the end of the sample period—introducing time delay.

In any engine, the instantaneous change in angular velocity at the crankshaft is attributable to the sum of the negative and positive work being done by the individual cylinders. The interaction of combustion, engine pumping, vibration, and driver-induced accelerations are manifested in the net work output by the crankshaft and its angular acceleration and deceleration. While this instantaneous work output can be related to selected angular locations of the crankshaft corresponding to the individual power-producing piston strokes, it is the net interaction of all forces on the crankshaft which influences "roughness". The work done by the pistons on the crankshaft is applied in specific angular intervals. However, when the work applied by the pistons becomes non-uniform, many modes of crankshaft acceleration/deceleration are excited, and the non-uniformity of combustion may be detected in a relatively short time frame, without waiting for the entire engine cycle to be completed. This signal is a continuous one, and is not preeminent in any selected angular region of the crankshaft.

In both of the Latsch et al patents as well as in their abandoned application, reference is made to the distinction between continuous and discrete sampling of "roughness"; Latsch et al teach away from continuous monitoring. Quoting from U.S. Pat. No. 4,161,162:

... a continuous measurement of the combustion chamber pressure would not be useful for a stable control of the fuel-air mixture and hence the operational behavior of an internal combustion engine.

The comparison of two subsequent samples as performed by Latsch et al also leaves open the possibility of comparing two "rough" samples to one another, and interpreting them as "similar" and therefore satisfactory.

Moreover, it is noted that Latsch et al use the terms "combustion chamber pressure" and "crankshaft acceleration" interchangeably—the implication being that either could be usefully monitored.

The same arguments which relate the the slowness of response of the Taplin method apply also to the Latsch methods; a delay is deliberately introduced into the servo loop. Any amount of delay—however small—limits the system response speed. According to Latsch et al, the delay is equal to approximately 180° of crankshaft rotation, which it a very significant limitation on response time. (180° corresponds to between 5 and 50 milliseconds, depending on RPM.)

The Latsch patents did correct one of the deficiencies of the Taplin apparatus by limiting the signals of interest to negative crankshaft accelerations only.

The final reference is Frobenius U.S. Pat. No. 4,104,990. The scheme shown there samples the RPM in two distinct angular regions of the crankshaft, and compares the two samples, so as to detect an angular deceleration beyond a threshold amplitude. This arrangement combines the least desirable features of both Taplin with those of Latsch.

As in Latsch, the information gathered is discontinuous, introducing measurement delay.

As in Taplin, the "roughness" cannot be detected until an unacceptable roughness level has already been exceeded. FIG. 3 of the Frobenius patent shows that the "lean limit" signal is almost totally absent when the air number is richer than the lean limit. At the prescribed "lean limit" mixture, the signal used to denote "roughness" increases markedly. This signal characteristic is similar to that of Taplin, in that the lean limit is reached without warning. As with Taplin, the Frobenius mixture controller must therefore approach the lean limit slowly, for fear of overshooting its mark.

Therefore, it is an object of this invention to provide a mixture control system which overcomes the transient response limitations inherent in the prior art.

It is a further object of the invention to provide an automatically controlled adaptive fuel metering system which compensates for variables which are not sensed directly, such as fuel chemistry, ambient conditions, and engine operating parameters.

It is another object of the invention to provide a closed loop, lean limit control apparatus which is less complex and more reliable than the prior art.

It is a further object of the present invention to provide an improved charge forming system for optimizing the mixture ingested by an internal combustion engine over a broad operating range.

It is another object of the present invention to provide an improved charge forming system which does not provide a predetermined or programmed mixture to an internal combustion engine.

It is a further object of the invention to provide a charge forming system for an internal combustion engine which effects a marked reduction in the output of pollutants by the engine.

SUMMARY OF THE INVENTION

The objects of the invention and needs of the art mentioned above are satisfied by the present invention, which comprises a transducer coupled to the engine for outputting a signal representative of engine power output. This power signal is time-differentiated to produce a second signal representing the rate of change of power.

When the second signal reaches a predetermined negative amplitude, i.e., when power decreases at a predetermined rate, a third signal is generated which may be a narrow marker pulse. This marker pulse (which denotes that a specific magnitude of power decline has occurred) is fed directly to a final control element, (without storage, delay, comparison, or other decision-making process) to immediately effect a mixture enrichment. Simultaneously, an independent control element supplies a steady stream of clock pulses to the final control element, making the mixture leaner at a prescribed rate. The net effect of feeding the final control element with two opposing signals (namely, go rich upon detection of a given deceleration rate—go lean continuously) is a servo control system which changes the mixture at a variable rate. The rate of change of the air/fuel ratio is automatically proportioned to the difference between the actual engine mixture and the desired operating point, as it is controlled by the number of marker pulses generated.

The provision of variable rate of correction of mixture, combined with instantaneous mixture enrichment upon generation of the marker pulse, allows the total servo control loop to track engine transient operation with improved speed and accuracy. These features will become apparent in the description of a preferred embodiment.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
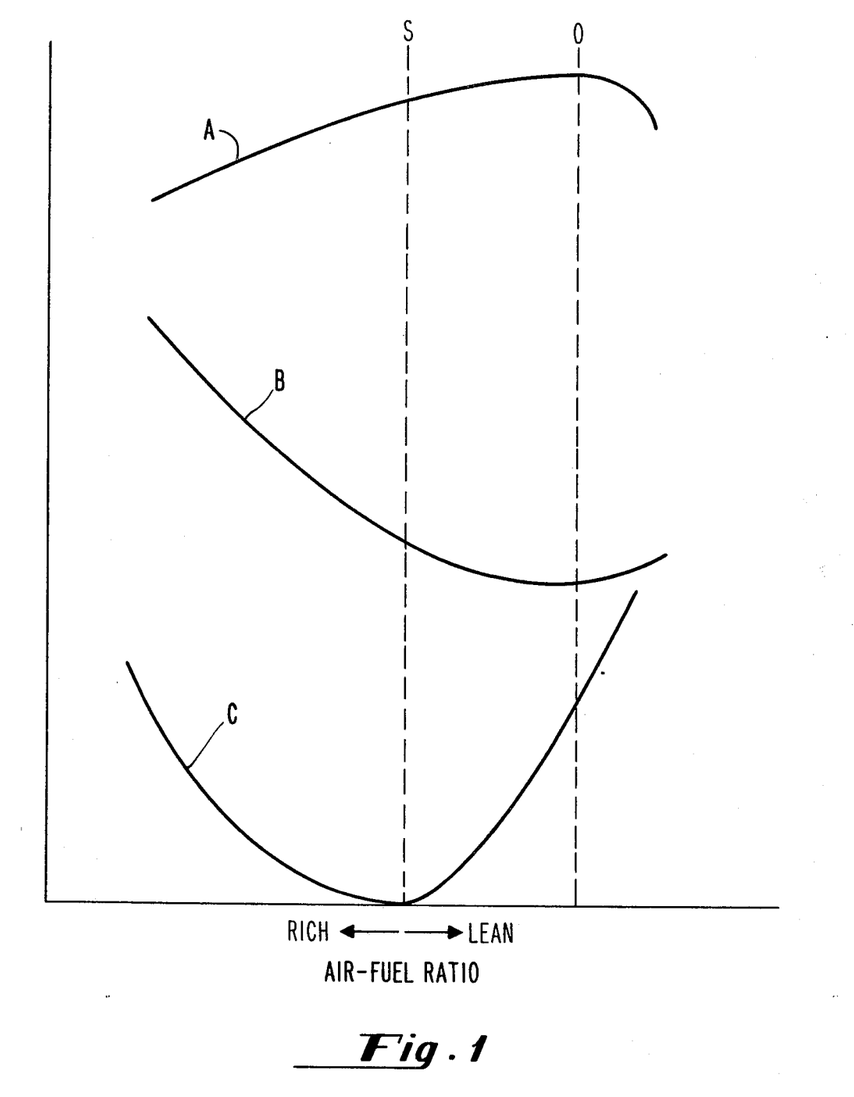
FIG. 1 is a graph illustrating the relationship between combustion efficiency, emissions of unburned hydrocarbons and frequency of marker pulse generation versus air/fuel ratio.

Curve A of FIG. 1 illustrates the relationship between combustion efficiency and the air/fuel ratio of charge ingested by an internal combustion engine. Curve B of the figure represents the relationship between hydrocarbon emissions of an internal combustion engine and the air/fuel ratio of the charge delivered thereto. The vertical line labeled S represents the stoichiometric air/fuel ratio, i.e., the point at which sufficient air is present to support theoretically complete combustion of fuel, which is approximately 14.7:1 with gasoline. However, the lean limit controller of the invention operates such that variations in the fuel used are automatically compensated for—that is, the stoichimetric ratio need not be input to the system or indeed, be fixed. The vertical line designated O represents the optimum air/fuel ratio for a particular set of conditions, and which is herein defined as the ratio providing maximum combustion efficiency of the engine at any given time and which is sometimes termed the "lean limit".

While it is recognized that there are various approaches to designating the efficiency of an internal combustion engine, in the most basic sense the point of maximum efficiency may be regarded as the point at which the most work is obtained for the least fuel. Accordingly, the efficiency A may be defined as $$A = (\text{power outputted})/(\text{fuel energy/time})$$

In other words, the maximum combustion efficiency may be regarded as the point where the ratio of energy flow out (power output) to potential energy (fuel energy) flow in is greatest. Upon reflection, it should be apparent that the point of maximum instantaneous engine efficiency is not necessarily the point of maximum engine power, but rather the point of maximum power for a given instantaneous fuel flow.

Further from FIG. 1 it will be seen that the rate at which undesirable emissions of, e.g., unburned hydrocarbons indicated by curve B, declines as efficiency increases. At the optimum air/fuel ratio O, when efficiency suddenly begins to decline, the rate of emission begins to rise dramatically. This is believed due to the fact that the engine cannot tolerate the still leaner air/fuel ratio and begins to suffer poor ignition, slow flame travel, and/or flame quenching, whereupon power decreases and unburned fuel is discharged with engine exhaust.

While the graph suggests a fixed, determinable point for both the stoichiometric and optimum air/fuel ratios, in practice this is not the case. Basic physical chemistry will predict the stoichiometric ratio at which sufficient air is present to completely react with all fuel. However, actual operation of an internal combustion engine at the true stoichiometric ratio is very difficult to attain, due to a number of factors including the uneven fuel distribution to various cylinders of the engine, uneven charge distribution in any given combustion chamber, irregular flame propagation in the combustion chamber, variations in air temperature and humidity, and many other uncontrollable factors. Furthermore, the optimum air/fuel ratio (i.e. the most efficient operating point) is even more difficult to predict and achieve since even more variables are involved. Indeed, the optimum ratio cannot be defined in terms of a fixed air/fuel ratio as can be stoichiometric ratio. This is because the point of maximum combustion efficiency is directly related to the power outputted by the engine. Under some operating conditions, a richer-than-stoichiometric mixture may be required; under other conditions an extremely lean mixture may be tolerated by the engine. Accordingly, the optimum ratio is continually changing during engine operation, "floating" so that it is not susceptible of accurate prediction or calculation.

Due to the ever-changing nature of the optimum ratio it can be seen that it is extremely difficult to attain this point by means of a "programmed" charge control system, no matter how complex. In theory the "programmed" type of system can be provided with a great number of setpoints, and the proper setpoint selected in response to monitored engine stimuli as suggested above. However, the selection of a setpoint for the control system must always be founded upon certain predictions—that is, the assumption is made that the occurrence of certain stimuli or detection of particular engine parameters is indicative of corresponding operating conditions. Unfortunately, even when a large number of engine parameters of stimuli are sensed, beforehand assumptions can still be inaccurate due to the multiplicity of factors affecting engine operation. Finally, even if all of the relevant parameters could be monitored and appropriate setpoints programmed for each, still the assumptions would only hold true for a relatively limited period of time since engine parameters change. As the engine components wear and/or age, so too would the appropriate response change.

In contradistinction to such devices the apparatus of the present invention does not implement a fixed or "programmed" change in the fuel/air ratio in response to sensed engine operating parameters. Rather, the thesis of the present invention is to monitor one or more engine parameters representative of instantaneous combustion efficiency and continuously, progressively increase the air/fuel ratio to the maximum which can be tolerated by the engine; that is, until the engine power output signal indicates that the desired mixture has been achieved.

Curve C of FIG. 1 represents the average frequency at which the "marker pulse" mentioned above—that is, the signal indicating that mixture correction is required—occurs as a function of mixture. Note that the minimum point of this curve corresponds to the stoichiometric ratio, and that the average frequency of the marker pulse increases as the mixture is varied away from stoichiometric. It should be understood that the marker pulse occurs irregularly in time, and the curve C in FIG. 1 thus represents an average statistical frequency, e.g., as if measured over a relatively long sample period. In fact, of course, the marker pulse occurrence is indicative of a weak or bad combustion event, and is not tied to any sample period. Note also that the minimum value of curve M is zero, indicating that the parameter being sensed (for example, negative crankshaft acceleration greater than a preset threshold) occurs at all mixtures other than stoichiometric, changing only in statistical probability as the mixture is changed.

Figure 2:
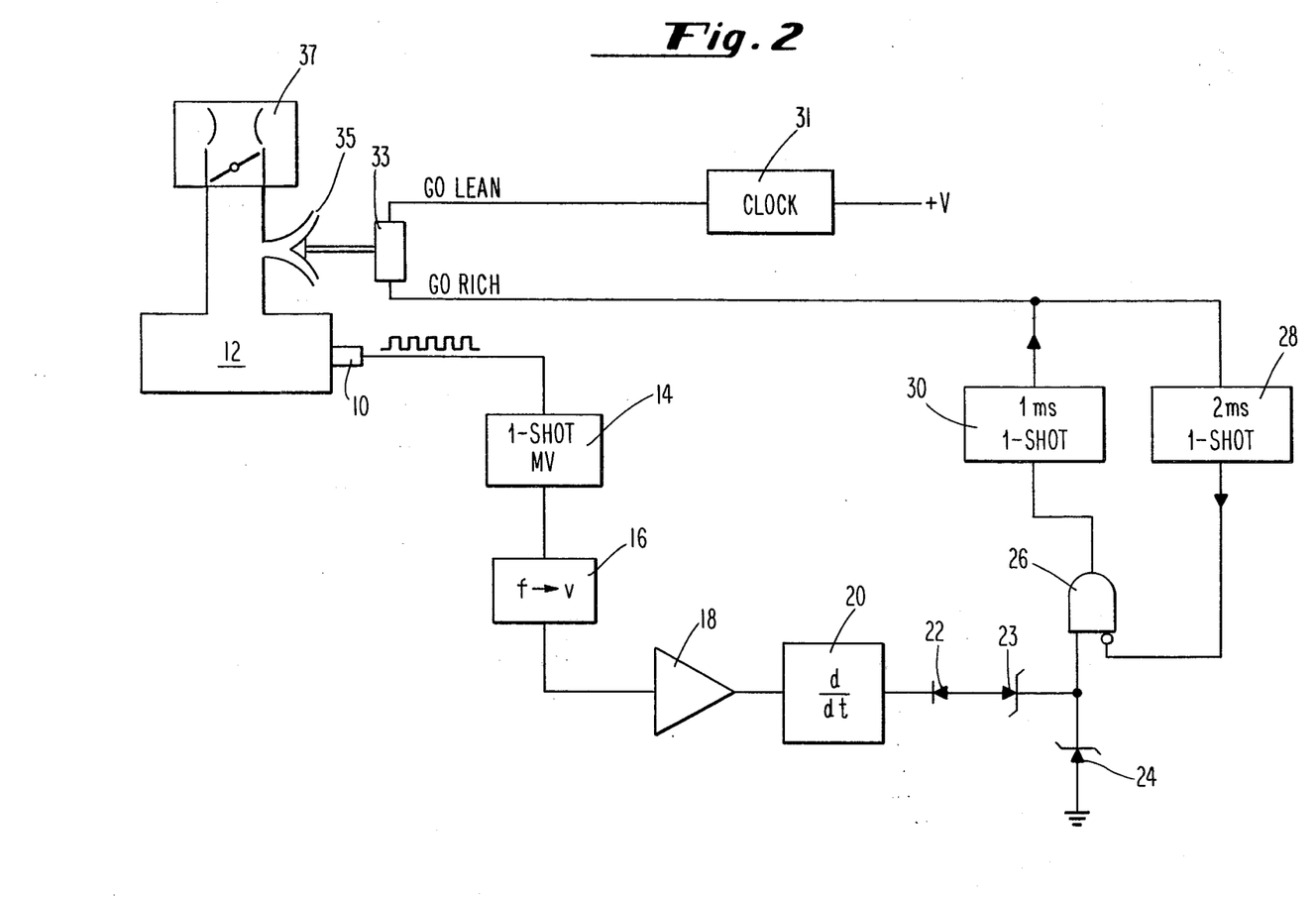
FIG. 2 is a schematic diagram of the lean limit control signal processing system of the invention.

Turning now to FIG. 2, a signal processing system for carrying out the present invention is illustrated. A transducer 10 is coupled to an internal combustion engine 12 and outputs a manifestation of engine combustion efficiency. At this point it should be noted that while engine 12 will be described in terms of a conventional piston engine, it is contemplated that the invention is fully applicable to various diverse sorts of internal combustion engines including but not limited to free-piston engines, turbines, and so-called "Wankel" or rotary engines. Accordingly, terms such as "combustion chamber", "piston", "manifold", should be regarded as being used in the generic sense regardless of the specific form which they may take in a given application.

The engine parameter which is monitored by transducer 10 advantageously is one which is directly related to engine output power. In theory, a transducer which directly outputs a representation of engine power will work admirably with the present system. So, too, a strain gauge indicating engine torque would work admirably. Also, a plurality of transducers such as utilized in the system disclosed in U.S. Pat. No. 4,064,748 to E. Leshner, one of the present inventors, may be used to produce an indication of engine power. However, for most applications it has been found that engine speed can be considered to be a reliable indication of relative engine power output. The information required by the present signal processing system is only the sense of short-term changes in engine efficiency, or (for a fixed fuel flow) in instantaneous engine power. Inasmuch as for most practical applications engine load does not change precipitously, the present inventors have determined that shortterm changes in engine RPM can usually be attributed to changes in engine power and in fact in a successfully-tested embodiment engine RPM was successfully used.

Once the present invention is understood it will be apparent to persons skilled in the art that various parameters can be selected from which to infer the instantaneous combustion efficiency of the engine, and appropriate signals derived for operating the system. Thus a signal representing instantaneous combustion efficiency is one which reflects a continuous, on-going process which changes with time so that the signals continuously follow or denote variations in combustion efficiency.

In the illustrated system the transduced signal representing engine power (RPM) constitutes a series of pulses. In a successfully-tested embodiment a magnetic transducer disposed in close proximity to the gear teeth on the engine flywheel was used to produce a train of pulses directly representative of engine speed. The pulses thus produced varied both in frequency and duration due to the nature of their generation. In accordance with good signal processing practices a one-shot multivibrator 14 is triggered by the pulses and outputs a train of pulses of fixed width, but whose frequency corresponds to the signals outputted by transducer 10. The frequency-modulated signal is then detected and converted to a voltage proportional to the pulse frequency by a conventional tachometer 16, which outputs a DC signal whose value is representative of engine speed. An operational amplifier 18 is then used to both amplify the signal and to buffer the tachometer 16 from succeeding stages.

The signal system thus far described corresponds closely to conventional tachometer circuitry, and in fact it is possible for a DC voltmeter to be coupled to amplifier 18 for producing an indication of engine speed. However, in the present system the DC signal is applied to a conventional differentiating circuit 20. As is familiar to those skilled in the art the differentiating stage, by definition, outputs a signal indicative of the rate of change of the inputted, engine speed signal. This signal is then applied to a diode 22 or the like so that only differentiated outputs indicative of engine power change in one direction or sense are communicated to subsequent circuitry. A threshold or breakover element, here illustrated as a Zener diode 23 is used to pass only signals exceeding a predetermined value. A clipper such as Zener diode 24 is also provided. In substance, the signal provided by the combined differentiator 20 and diodes 22, 24 is a single-polarity signal having a fixed value. In a preferred embodiment the differentiated signal is passed to subsequent circuitry only when engine power is decreasing.

It will be appreciated that despite provisions of heavy flywheels and the like, engine crankshaft speed is constantly varying from its nominal value. The circuitry described above comprises means for providing an output signal when the crankshaft speed decelerates at a rate greater than usual, thus indicative of a weak combustion event, which is usually caused by departure of the mixture from the optimum. Accordingly, when instantaneous power (RPM) is steady, or increasing, no signal is produced. When engine power (speed) decreases at greater than a preset rate, however, a DC signal is produced. In accordance with good signal processing practice, this signal is applied both to an AND gate 26, and to an inverting terminal of the AND gate by way of a two millisecond one-shot oscillator 28. The output of AND gate 26 triggers a one millisecond one-shot multivibrator 30. The output—regulated pulses of uniform height and width and having at least a minimum space therebetween—in turn causes a final control element 33 to effect an immediate mixture enrichment.

Independent of the above-mentioned circuitry, a clock 31 generates a train of pulses which are equally spaced in time. The frequency of these pulses is controlled by a voltage +V applied to the clock 31.

In a preferred embodiment, the final control element 33 is a digital stepping motor, either rotary or linear, having two inputs, one of which is fed by the output of one-shot 30, the other by the output of the clock 31. One pulse input to either terminal of the motor causes it to take a step; a pulse applied to one of the inputs causes a step in a first direction, while a pulse on the other input causes the motor to take one step in the opposite direction. The stepping motor 33 controls a valve 35 which effects a change of mixture by bleeding additional air into the fuel/air charge which is supplied to the engine 12 by a conventional carburetor 37 or any other type of fuel/air metering device.

Operation of the system of FIG. 2 will now be discussed in detail, making reference to the previously-enumerated elements.

In a preferred embodiment, the mixture supplied by the conventional carburetor 37 is in the vicinity of stoichiometric. As discussed above, during any given period of time a marker pulse is generated whenever the angular deceleration of the crankshaft exceeds a preset limit, typically approximately $-0.2$ radians/sec$^2$.

From inspection of curve M in FIG. 1, it can be seen that when the average marker frequency is less than that at which the curve C intersects the line O indicating the optimum mixture, the mixture should be leaned. Accordingly, the frequency of clock pulses supplied by clock 31 to the "go lean" input of the stepper motor is this frequency. With a presently preferred stepper motor, this is approximately 50 pulses per second, for example.

Thus when the engine is running at the stoichiometric mixture, the "go rich" signal would occur very infrequently—at perhaps 1 pulse per second—due to random weak combustion events. Meanwhile, the steady stream of "go lean" pulses supplied by the clock 31 will cause the stepper motor 33 to open the air bleed valve 35 further and further. The result is that the servo 33 will step leaner at a net rate proportional to the difference between the frequencies of the marker and clock pulses—in this example, at a net rate of 49 steps per second.

A short time increment later, the mixture will have been leaned, and the "go rich" marker pulses would accordingly occur more often; at, e.g., a nominal 40 pulses per second. The servo 33 moving according to the difference between the two input signals, would be stepping lean at a net rate of 10 steps per second. From this example it can be seen that the rate of change of mixture is proportional to the difference between the actual mixture and the desired mixture. In other words, the speed of correction is proportional to the magnitude of the correction called for; as the mixture approaches optimal, the rate of correction decreases, thus substantially avoiding overshoot.

For a second example, assume that some driver-induced engine transient has caused the mixture to become leaner than optimum, and the "go rich" pulse rate rises to a nominal value of 65 pulses per second. Since this exceeds the "go lean" clock pulse rate, the servo 33 would step in the rich direction at a net rate of 15 steps per second.

At this point, it is useful to examine the dynamics of a servo such as that described. If pulses are supplied to both inputs of the servo at a uniform rate, the analysis of servo direction and net rate of movement are exactly as described above. The "go rich" pulse, however, are not of uniform frequency. Being derived from the engine only when a specific deceleration appears at the crankshaft, they are of random nature, though statistically predictable over time. When a pulse train of uniform frequency such as the clock pulses interacts (in an opposite sense) with a non-uniform train of pulses, the net result (here, rate of servo motion) changes dynamically in dependence of the pulse spacing of the nonuniform pulse train. Applied to this invention, the above analysis lends insight into the specific stepping movements which occur during rapid engine transient operation.

The analysis may be described with reference to a conventional automobile engine assumed to be in steady state operation, the "go lean" pulses and the "go rich" pulses occurring, on the average, at the same frequency. This implies that the engine is running at an optimum mixture, and that the servo is in equilibrium. Assume that the driver steps down on the throttle, commanding vehicle acceleration. As a result of the throttle movement, two changes take place: (1) the engine load is increased, which tends to change the optimum mixture to one which is richer than before (i.e., the desired operating point is changed); (2) the carburetor, being programmed in the conventional fashion to anticipate the need for mixture enrichment during a positive transient, squirts extra fuel through an enrichment device, typically an accelerator pump. A short time later, the mixture enrichment provided by the carburetor has stopped. Assuming that during the period of power demand the enrichment provided by the carburetor was greater than necessary, as is usual to ensure good throttle response, the extra fuel would cause operation of the engine to move toward the left of curve C of FIG. 1 and caused the frequency of the "go rich" pulses to drop, allowing the servo to step leaner. The servo may take several discrete steps in the lean direction during the interval between two "go rich" pulses. Next, assume that as soon as the extra fuel has been ingested by the engine, the mixture is too lean; for example, because the extra squirt of fuel has been consumed while the throttle remains open. The leaner-than-optimum mixture will cause several "go rich" steps to occur between two "go lean" pulses, correcting the mixture. It will be appreciated from this description that the rate of servo travel is not limited to the arithmetic difference between two frequencies; instead the servo rate is proportional to the dynamic difference between the periods of the two control pulses. Moreover, it will be appreciated that the lean limit control system of the invention responds very quickly to off-optimum mixtures, and tracks rapid transient engine operation with minimum "hunting" or "overshoot".

In addition, the servo loop responds at a rate proportional to the difference between an actual value and a preset value, without the need to compare or subtract those values.

The preset "go lean" pulse frequency which determines the optimal mixture achieved by the system of the invention is adjustable via input $+V$. This adjustment may be based on the number of cylinders in the engine, number of teeth on the flywheel gear, if this is used for pulse generation, and the like. It may also be influenced by engine operating parameters such as temperature, RPM and load. In the preferred embodiment, the clock runs at a constant frequency, which, once determined for a particular engine, need not be adjusted. The arrangement of the control system of the invention, in which the mixture is biased leaner steadily until a predetermined rate of weak combustion events is reached, provides automatic compensation for all these variables. While the precise mixture at which this rate of weak combustion events occur may vary greatly over time, the system of the invention will seek out this mixture and control the engine to operate at or near that point.

It can be seen by those skilled in the art that it would be possible to operate the engine at its "rich running limit", simply by reversing the logic which drives the servo. This control strategy may be advantageous for aircraft engines during high power modes of operation for cooling purposes. The "rich limit control" strategy would also be useful in competitive vehicle racing.

It should also be apparent to those skilled in the art that the function provided by a stepping servo motor-driven air valve can be accomplished through alternate means.

For example, the "go rich" and "go lean" pulses could be fed into a digital counter, one pulse causing the counter to count up, and the other causing the counter to count down. If appropriate stops are provided so that the counter cannot count below zero or above some upper limit, the numerical state of the counter can be used to determine the pulse duration of an electronic fuel injection system.

Additionally, it should also be apparent to those skilled in the art that the lean limit control system could be used to control the flow of exhaust gas recirculation instead of airflow, for purposes of providing improved exhaust emission control by lowering combustion temperature.

From inspection of FIG. 1, it can be seen that the range of operation of the lean limit control system described by this specification lies between an infinitely lean mixture, and some "rich combustion limit", i.e., that point at which the curve C of FIG. 1 on the rich side of stoichiometric reaches the height of the intersection of the lean side of the curve C with the line O indicating the optimum mixture. If the range of operation is to be extended to the rich side, an additional sensor may be used to indicate to the mixture controller whether the actual mixture is on the rich or lean side of the stoichiometric ratio. This sensor may be a conventional exhaust oxygen sensor, of the known type currently used in some production vehicles.

This extension of the range would be useful if the system described must compensate for gross changes in the desired mixture. For example, if the fuel used is to be allowed to vary between 100% alcohol and 100% gasoline, the operating range of the mixture controller would need to be capable of dealing with variations of up to 2 to 1 in optimal air/fuel ratio. However, the system as described is capable of delivering the optimum mixture over a wide range of fuels without this additional compensation.

It will be appreciated that has been described a system for the control of the ratio of air to fuel supplied to an internal combustion engine which satisfies the objects of the invention and needs of the art. For example, its response time is substantially unlimited by comparison of successive combustion events since it responds to any weak combustion event by instantaneously enriching the mixture. Furthermore, since no comparison is performed between successive combustion events, there is no danger that two weak combustion events occurring in succession will "fool" the control system into thinking both were acceptable. Furthermore, and perhaps most importantly, since the system is adaptive and is not programmed, it consistently controls the mixture to reach the optimum mixture regardless of whether that optimal mixture remains constant over time. Instead, the engine is controlled to continuously be leaned until a preset average rate of weak combustion events is detected. At that point, the mixture is controlled to be richened. In this way, the actual mixture at which the preset average rate of weak combustion events is reached is of no consequence, thus permitting the engine operation to vary over time without significantly affecting the performance of the control system. As opposed to prior art programmed systems, in which an engine operating parameter is sensed and a fixed fuel/air mixture is supplied according to a predetermined plan, the system of the present invention controls the fuel/air mixture supplied to the engine only in response to its immediate operation, thus freeing it from the constraints imposed by any programmed system.

It will, furthermore, be appreciated that the provision of the system of the invention with a negative stream of steady pulses tending to bias the mixture in the lean direction, counterbalanced by a stream of pulses generated in response to weak combustion events, means that the control system is not constantly trying to reach a predetermined point of operation as was done according to the prior art. Instead the present invention recognizes that it is essentially impossible to define the optimum point of operation of a system as complex as an internal combustion engine, particularly when used in an automobile subject to rapid control transients, and accordingly avoids this necessity by providing an adaptive control system. With respect to prior art adaptive systems, the use of the "balancing" effect provided by the input on the one hand of a steady positive stream of pulses and on the other of a negative pulses generated in response to bad combustion events, provides a control philosophy which is akin to a statistical smoothing of the inputs of the weak combustion events. That is, if one were to, e.g., count the number of weak combustion events observed over some discrete time interval and correct the mixture in response thereto, as done in the prior art Taplin, Latsch and Frobenius systems, one would necessarily introduce a time lag. By instead making the assumption that the pulses are more or less evenly distributed over time and instantaneously correcting the mixture in response to each detection of a weak combustion event, the present invention eliminates this time delay in favor of substantially instantaneous response time.

Another advantage provided according to the preferred embodiment of the invention in which a stepping motor is used to respond to each pulse whether it be a "go lean" pulse provided by the clock or a "go rich" pulse provided in response to detection of a bad combustion event, is that the speed of response is directly proportional to the difference between the frequency of the two signals: that is, if the mixture is grossly rich, the "go lean" pulses will predominate and the engine will accordingly be controlled to very quickly "go lean", while as it approaches its optimal operating frequency the "go rich" pulses will occur more and more frequently, thus tending to slow the approach of the servo to the desired operating point, thus avoiding overshoots, hunting and other defects noted above with respect to the prior art, while permitting much better response to transients, essential if drivability is to be maintained.

It will be appreciated by those skilled in the art that there are numerous other embodiments of the invention which combine the above advantages and that there are additionally numerous modifications and improvements which can be made to the embodiment disclosed without departure from its essential spirit and scope, which is therefore not to measured by the present disclosure, but merely by the following claims.

We claim:

1. Apparatus for controlling valve means for altering the ratio of the fuel/air mixture supplied to an engine to equal an optimum ratio varying in accordance with the instantaneous power output of said engine, comprising:
   means for providing a first fixed signal for controlling said valve means to alter said mixture in a first direction;
   means for providing a second variable signal proportional to departure of said mixture from said optimum ratio to cause said valve means to alter said mixture in a second opposite direction; and
   means for controlling said valve means adapted to alter said ratio at a rate proportional to the difference between said first and second signals.

2. The apparatus of claim 1 wherein said second variable signal proportional to departure of the ratio of said mixture from said optimum ratio is generated by means for monitoring the instantaneous power output of said engine.

3. The apparatus of claim 2 wherein said means for monitoring comprises means for differentiating a signal proportional to the instantaneous crankshaft speed of said engine.

4. The apparatus of claim 1 wherein said first direction is the direction of leaning said mixture and said second direction is the direction of enrichening said mixture.

5. An adaptive system for altering the fuel/air ratio of the charge supplied to an engine comprising means for monitoring operation of said engine and for detecting when the rate of change of power output by said engine exceeds a predetermined negative value, means for gradually and continually leaning the charge supplied to said engine, and means for instantaneously richening said charge, at a rate proportional to the rate of change of power output by said engine in response to signals output by said means for monitoring operation of said engine, upon said detection.

6. The system of claim 5 wherein said means for monitoring operation of said engine measures the angular velocity of the crankshaft of said engine.

7. The system of claim 5 wherein said charge is altered by valve means controlled to bleed a variable quantity of air into said charge.

8. The system of claim 7 in which said valve means is operated by electric servomotor means.

9. The system of claim 8 wherein said servomotor means is a stepping motor, and said means for gradually and continually leaning said charge comprises clock means for supplying a steady train of pulses to said stepping motor, whereby said valve means is gradually controlled to bleed more air into said charge.

10. The system of claim 9 wherein said means for richening said charge comprise means for applying pulses to said stepping motor in response to said detection, whereby said valve means is instantaneously controlled to bleed less air into said charge.

11. Apparatus for the controlling of the ratio of the fuel/air mixture supplied to an internal-combustion engine, comprising:
   means for providing a first signal indicative of the power output by said engine;
   means for differentiating said first signal and for producing a second signal indicative of the rate of change of said first signal; and
   means for altering said fuel/air ratio in response to said second signal exceeding a predetermined level, wherein said means for altering said fuel/air ratio is controlled to alter said ratio at a rate dependent on the amount by which said second signal exceeds said predetermined level.

12. The apparatus of claim 11 wherein a third signal comprising a series of pulses is produced by said second signal exceeding said predetermined level and is used to control said means for altering said fuel/air ratio.

13. The apparatus of claim 12 wherein the frequency of the pulses comprising said third signal depends on the degree to which said second signal exceeds said predetermined level.

14. The apparatus of any of claims 11, 12 or 13 wherein said means for altering said fuel/air ratio is controlled to alter said ratio only when said second signal is negative.

15. Apparatus for controlling the fuel/air ratio of the charge supplied to an internal combustion engine, comprising:
   valve means for controllably varying the ratio of the charge;
   electric servo motor means for controlling said valve means;
   first signal source means for applying a first bias signal to said servo motor for biasing variation of the ratio of said charge in a first direction; and
   second signal source means for applying a varying second signal, generated in response to sensed engine operating parameters, to said servo motor to cause variation of the ratio of said charge in a second direction opposite said first direction,
   whereby equilibrium operation is reached by said servo motor means when said first bias signal is substantially equalled by said varying second signal, thus controlling said ratio in order to control said operating parameters.

16. The apparatus of claim 15 wherein said servo motor means comprises a stepping motor.

17. The apparatus of claim 15 wherein said first signal source means is a clock for applying a steady stream of pulses to said servo motor means.

18. The apparatus of claim 15 wherein said second signal source means comprises means for supplying pulses to said servo motor means in response to detection that the rate of change of the power output of said engine exceeds a predetermined rate.

19. The apparatus of claim 18, comprising:
   means for producing a first signal dependent on the instantaneous power output by said engine;
   means for producing a second signal in response to differentiation of said first signal; and
   means for outputting a pulse when said second signal exceeds a predetermined level.

20. The apparatus of claim 19 wherein instantaneous engine angular velocity is input to said means for producing a first signal dependent on instantaneous power output by said engine.

21. Apparatus for controllably varying the fuel/air ratio of the charge supplied to an internal combustion engine, comprising:
   means for detecting weak combustion events, and outputting first pulses in response thereto;
   means for generating a steady stream of pulses; and
   means for varying the air/fuel ratio of said charge in response to said pulses, said first pulses being applied to vary said ratio in a first sense and said stream of pulses applied to vary said ratio in the opposite sense, whereby the fuel/air ratio is urged toward an equilibrium point at which the average rate of said weak combustion events is substantially equal to the rate of said steady stream of clock pulses.

22. The apparatus of claim 21 wherein said means for varying the air/fuel ratio of said charge comprises servo motor means controlled to vary said charge in response to said pulses.

23. The apparatus of claim 21 wherein said means for detecting weak combustion events comprises means for differentiating the instantaneous crankshaft velocity.

24. The apparatus of claim 21 wherein said equilibrium point is preset at a selected lean mixture combustion limit for said engine.

* * * * *